US005735625A

United States Patent [19]

O'Brien

[11] Patent Number: 5,735,625

[45] Date of Patent: Apr. 7, 1998

[54] APPARATUS FOR MATCHING RELATED CONSUMER ELECTRONIC PRODUCTS

[75] Inventor: Thyra O'Brien, Woodbury Heights., N.J.

[73] Assignee: Thomson Consumer Electronics, Inc., Indianapolis., Ind.

[21] Appl. No.: 477,918

[22] Filed: Jun. 7, 1995

[51] Int. Cl.$^{6}$ .............................. F16C 11/00; B42F 21/00

[52] U.S. Cl. .............................. 402/79; 40/393; 283/42; 283/63.1; 283/99; 283/115; 281/15.1

[58] Field of Search .............................. 283/99, 38, 42, 283/63.1, 115; 40/390, 393; 281/15.1, 40, 3.1; 402/79; 434/379

[56] References Cited

U.S. PATENT DOCUMENTS

| | | | |
|---|---|---|---|
| 647,704 | 4/1900 | Powers | 281/15.1 |
| 1,248,488 | 12/1917 | Harriss | 281/15.1 |
| 1,307,708 | 6/1919 | Smith | 281/15.1 |
| 1,691,761 | 11/1928 | Harper | 283/115 |
| 2,203,167 | 6/1940 | Lodwick | 283/63.1 |
| 3,871,115 | 3/1975 | Glass et al. | 40/390 |
| 4,652,014 | 3/1987 | Maher | 283/115 |

*Primary Examiner*—David P. Bryant
*Attorney, Agent, or Firm*—Woodard, Emhardt, Naughton, Moriarty & McNett

[57] ABSTRACT

A flip book for displaying electrical connection data for consumer electronic equipment on an arrangement of side-by-side panels includes nine FROM panels each of which is arranged with connection information for three different hook up options. Additionally included are eleven TO panels each of which is arranged with connection information for a corresponding item of consumer electronic equipment. The nine FROM panels are arranged on the left side of the flip book and each includes a tab portion identifying the corresponding item of consumer electronic equipment. The eleven TO panels are positioned on the right hand side of the flip book and include a tab portion identifying the corresponding item of consumer electronic equipment. A spiral binder allows the user to easily select the desired item of equipment by selecting the tab portion and flipping over any covering panels. Once the panels for the two items of equipment to be connected are selected and viewed in a side-by-side arrangement, the user is able to see what cable choices are available, what those cables look like, and the connectors or jacks to be used on each item of equipment. The three different hook up options also include information as to various cable lengths depending on the arrangement of the equipment. The disclosed flip book is intended to be used primarily at the point of sale so that the connections can be explained and the required cables obtained by the end user prior to leaving the consumer electronics store.

3 Claims, 5 Drawing Sheets

APPARATUS FOR MATCHING RELATED CONSUMER ELECTRONIC PRODUCTS

BACKGROUND OF THE INVENTION

The present invention relates in general to apparatus for matching related products and in particular to the structure and arrangement of guidebooks and instructional manuals associated with related products, such as consumer electronic products. More specifically, the present invention relates to a flip book structural configuration whereby instructional guidance is provided for the connection of related electronic components.

In the field of consumer electronics, a wide variety of components are available and each component may have a variety of options for connection to other components. For example, a television may be connected with a laser disc player, CD player, VCR, and/or a digital satellite system (DSS). While there are numerous other options for the connection of consumer electronic components, including various audio and video options, the specifics of what connector or panel jack on one component connects to what connector or panel jack on the other component and by means of what style of cable is not always clear to a lay consumer. In addition to a variety of audio and video connection options, there is a need to select the preferred cable for the connection, including the appropriate cable length.

When a consumer electronic product is purchased, the basic connection cables are usually provided such as for the connection of a television to a VCR. However, other connections may require cables which are not provided by the component manufacturer. It would therefore be helpful to have a connection or hook up guide so that the components which are desired to be connected can be selected and the required cables identified while still in the consumer electronics department or store. This enables the consumer to identify and purchase the required cables and determine the proper connections which are required, regardless of the particular components.

In order to facilitate the accessibility and ease of use of this connection information, it would be an improvement to the conventional user or installer and as a supplement to installation manuals to provide a flip book which can be used at the store location for virtually all realistic options. By having such a flip book at the point of sale, the purchaser is able to identify what connection options are possible, which ones are desired and then secure the required cables for the desired connections before leaving the store.

The present invention provides a unique flip book with hook up options which includes a first series of different component panels on the left side of the book and a second series of different component panels on the right side of the flip book. The left side represents the FROM connection location and the right side of the book represents the TO connection location. An identification of the preferred connection cables is provided. In use, the customer turns to the first component on the left side of the flip book and then turns to the second component on the right side of the flip book. The various hook up options are listed and for each one of these hook up options the preferred cable or cables are identified as well as what connector or rear panel jack is to be used. The connector and rear panel jacks as well as the ends of the cable are illustrated so that the purchaser has some idea as to what these components should actually look like on the equipment. The flip book also provides information as to what component-to-component connections are not possible.

While flip charts are known to exist and while some may disclose technical or scientific data, the inventor is not aware of any split flip chart where the connection of consumer electronic equipment is detailed for use at the point of sale. As such, the present invention is believed to be novel and unobvious.

SUMMARY OF THE INVENTION

A flip book for displaying the data contained on a plurality of information panels in a selectable side-by-side arrangement according to one embodiment of the present invention comprises a plurality of first information panels each of which is arranged with data corresponding to a particular first topic, a plurality of second information panels each of which is arranged with data corresponding to a particular second topic, the first and second topics having an established relationship to each other, a holder constructed and arranged for receiving the plurality of first information panels in a first stack array and for receiving the plurality of second information panels in a second stack array, the first and second stack arrays being positioned adjacent each other and the holder permitting a preselected one of the first panels to be positioned for viewing and a preselected one of the second panels to be positioned for simultaneous adjacent viewing with the preselected first panel.

DESCRIPTION OF THE PREFERRED EMBODIMENT

Figure 1:
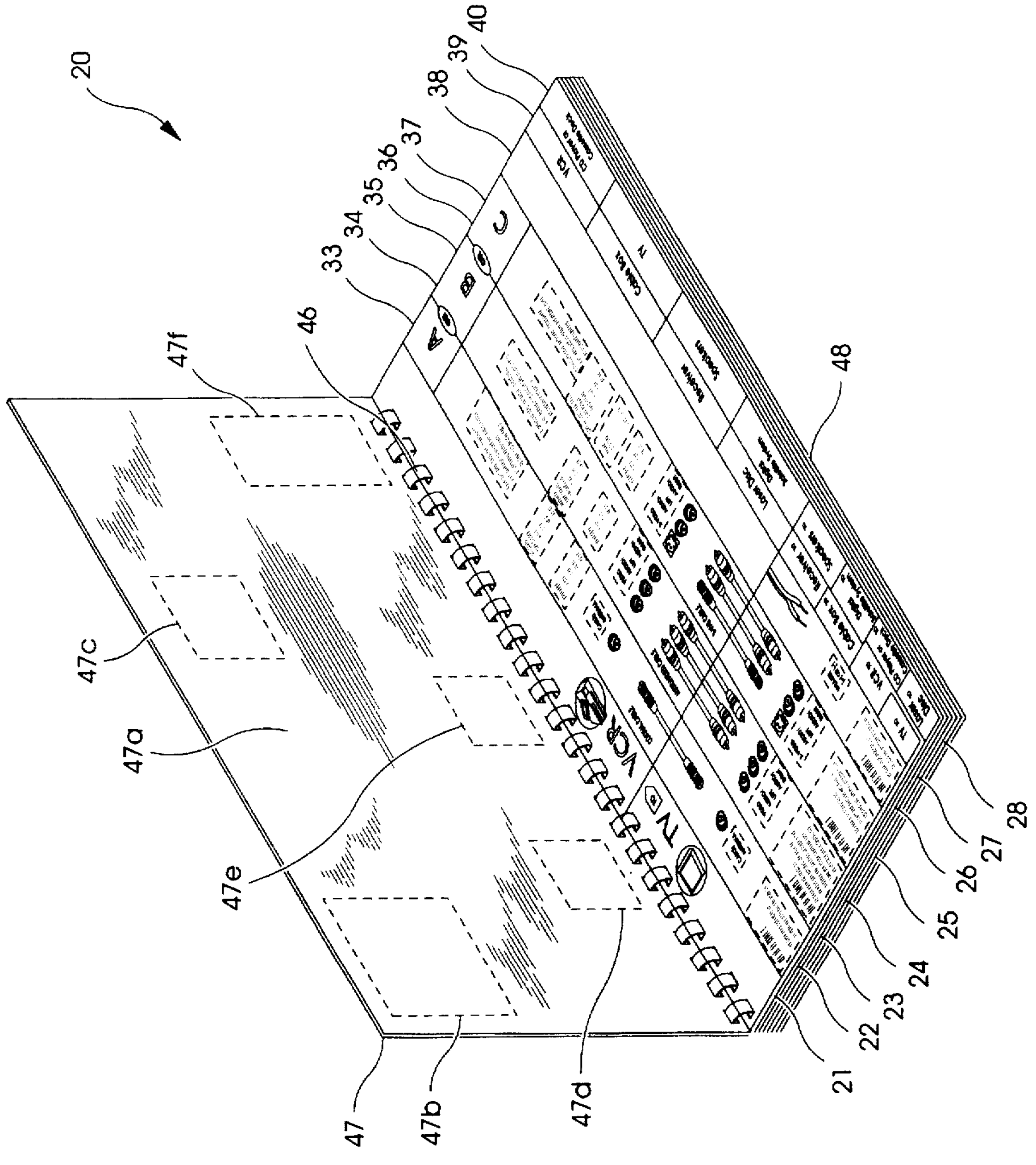
FIG. 1 is a perspective view of a flip book according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated an interconnection flip book 20 which is arranged with eight FROM panels 21–28 and eight TO panels 33–40 that describe various hook up options for different items of consumer electronic equipment. Also described by the content of flip book 20 is the correct cable or cables required for the equipment connection for each hook up option. Spiral binder 46 is used to maintain the stack of FROM panels and the stack of TO panels in their predetermined and desired order. The continuous nature of binder 46 enables the stack of eight FROM panels to be positioned side-by-side with the stack of eight TO panels. By flipping through these two stacks of panels a consumer or salesperson can readily determine how to connect one component to another component with different hook up options. In certain situations there may be only one hook up option and there are some component-to-component connections which are not compatible, such as trying to connect one cable box to another cable box. The flip book 20 explains which options are not compatible.

The appropriate cable for the selected hook up option is disclosed by the content of the selected TO panel and various cable part numbers are provided for different cable lengths. An outer cover 47 and backing 48 are included and are also secured by the spiral binder 46 in order to complete flip book 20. The outer cover 47 and backing 48 are positioned so as to sandwich therebetween the two stacks of panels. This arrangement in combination with the plastic spiral binder 46 creates a book-like package which enables the individual TO panels and FROM panels to be easily handled and manipulated. The back side of each flipped over panel, including the back side 47*a* of cover 47, includes special instructions.

Area 47*b* may contain information regarding what hook up combinations for the component detailed on FROM panel 21 are not compatible. Area 47*b* may also contain special instructions such as how to duplicate a movie tape. Area 47*c* may contain information regarding what hook up combinations for the component detailed on TO panel 33 are not compatible. Area 47*c* may also contain special instructions and in the illustrated embodiment this area explains that to make a duplicate copy of a movie you need to connect one VCR to another VCR.

Areas 47*d–f* indicate the selection steps associated with proper use of flip book 20. Area 47*d* indicates that the first step is to find the first component you want to hook up. The second step as explained in area 47*e* is to select the second component to be connected. The third step as explained in area 47*f* is to evaluate the hook up options and select the desired one.

The back side of each flipped over panel includes the foregoing areas of information for the component detailed on the next panel in the stacked series. For example, the back side of panel 21 relates to the component of panel 22, the back side of panel 22 relates to the component of panel 23, and so forth. The same arrangement is present for the TO panels.

In normal use, flip book 20 would be used by a consumer electronics store, a parts counter, or even a consumer if the pieces of equipment of the consumer are being connected and disconnected for different arrangements. Use in a consumer electronics department or store enables a salesperson to explain to a customer exactly how to connect two pieces of consumer electronic equipment. In order to use flip book 20, the first step is to flip to the FROM panel for the first piece of equipment which is to be connected. The next step is to flip to the desired TO panel for the second piece of equipment which is to be connected to the first piece of equipment. What results is a full page, side-by-side display which gives one or more different hook up options, depending on the specific components, and for each option there is an indication of the required cables and illustrations of the cables and the connectors or panel jacks which are to be used. The connectors and jacks of each piece of equipment are labeled with an identification, but more importantly their general shape and configuration are illustrated so that they can be easily identified when looking at the actual equipment. By enabling the customer to actually see what the cables look like, as well as what the connectors or jacks look like, and then determine exactly what item connects to what in order to connect the two pieces of consumer electronic equipment, a greater comfort level can be given to the consumer. Additionally, the consumer can thereafter purchase whatever additional cables may be desired or required for the particular home entertainment arrangement which the consumer is contemplating. Cable length options are provided so that if additional cables are being purchased, the customer will be able to determine the required length based on where the components will be positioned and how they will be arranged relative to each other.

Figure 2:
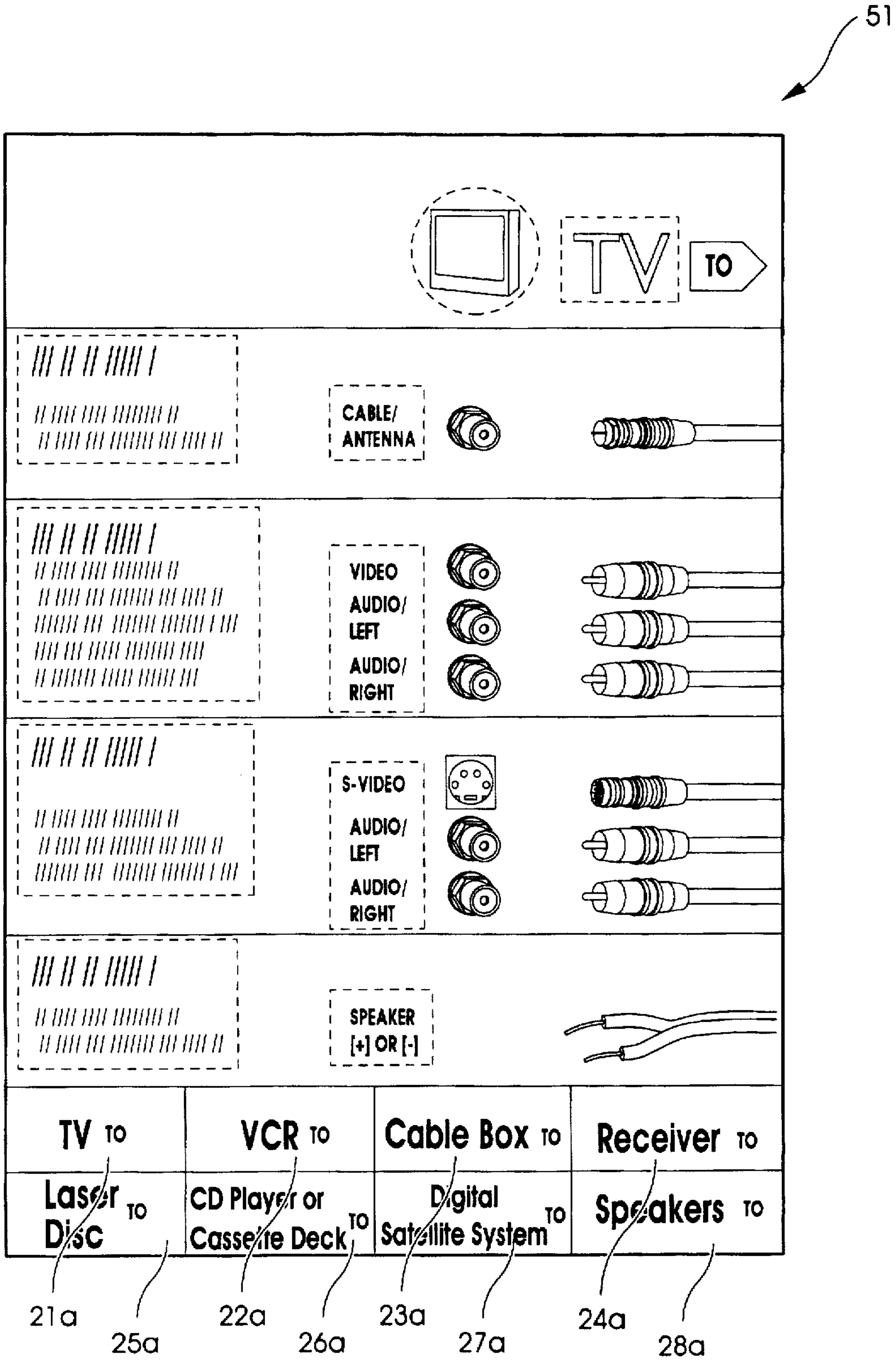
FIG. 2 is a top plan view of a stack of first information panels comprising one portion of the FIG. 1 flip book.

Referring to FIG. 2, the stack 51 of FROM panels 21–28 is illustrated as detached from the spiral binder 46. Each FROM panel includes an integral tab portion 21*a*–28*a* positioned along the lower edge and this tab portion denotes the item of consumer electronic equipment which is detailed on the corresponding panel. These eight tab portions are offset and indexed relative to each other in such a way for all eight tab portions 21*a*–28*a* to be visible at the same time, assuming that the stack of all eight FROM panels is arranged without any panels being omitted and without any panels being flipped over. Each tab portion 21*a*–28*a* has a different and contrasting color in order to make identification and FROM panel selection easier. Each of the eight FROM panels have a similar format, although a different content and one FROM panel is illustrated in FIG. 4.

Figure 3:
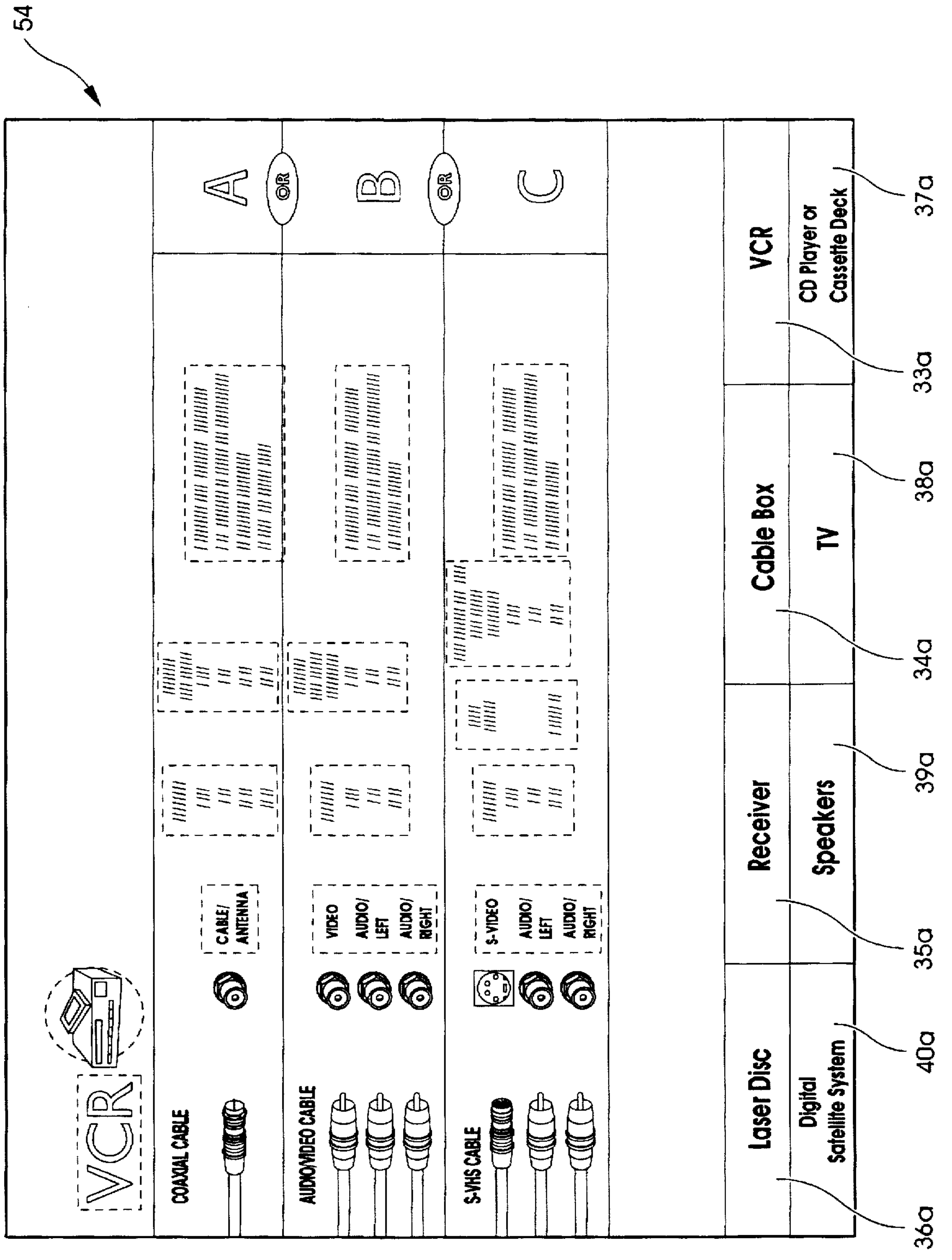
FIG. 3 is a top plan view of a stack of second information panels comprising one portion of the FIG. 1 flip book.
Figure 5:
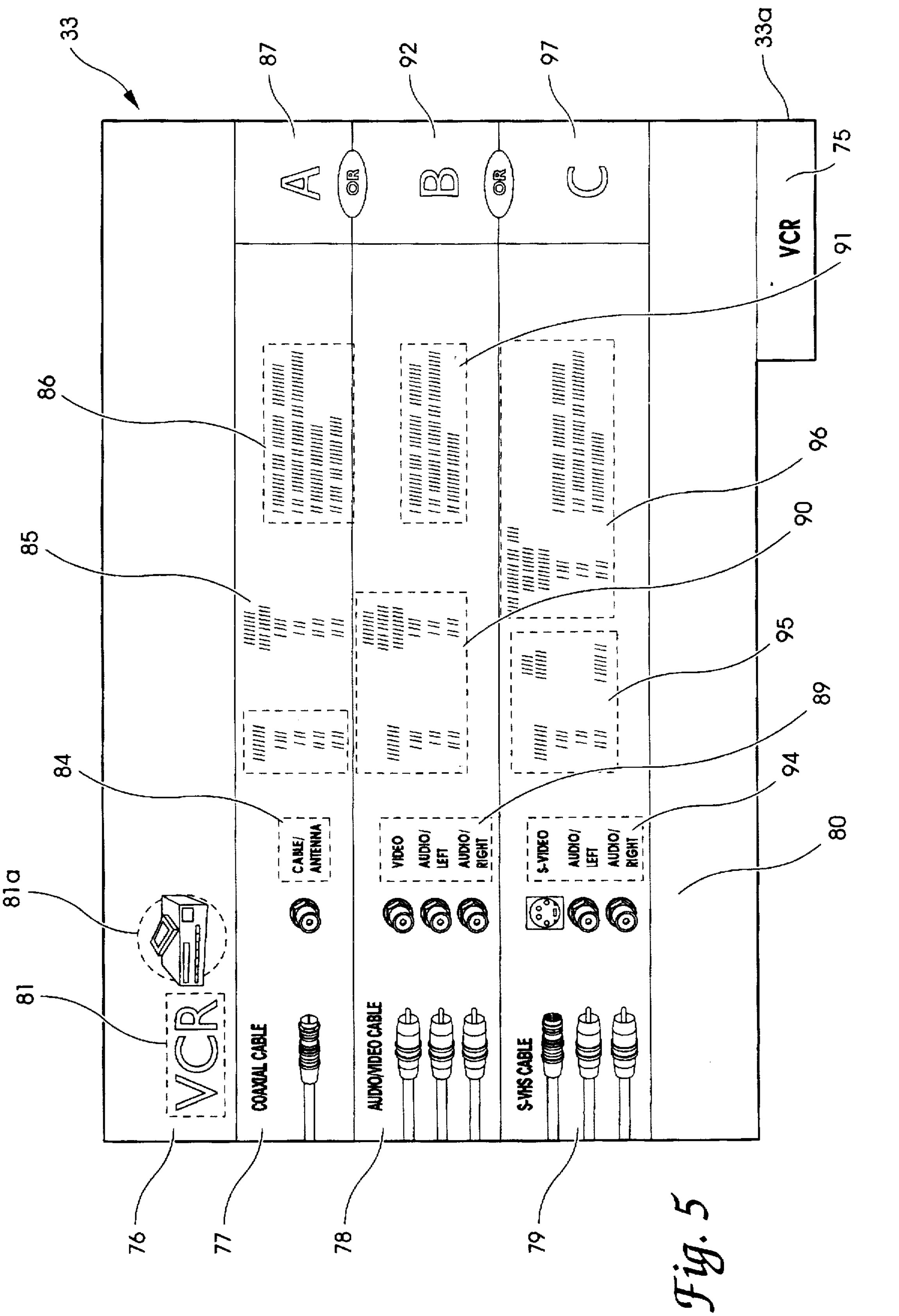
FIG. 5 is a top plan view of one of the FIG. 3 second panels according to the present invention.

Referring to FIG. 3, the stack 54 of TO panels 33–40 is illustrated as detached from the spiral binder 46. Each TO panel includes an integral tab portion 33*a*–40*a* positioned along the lower edge and this tab portion 33*a*–40*a* denotes the item of consumer electronic equipment which is detailed on the corresponding TO panel. These eight tab portions are offset and indexed in such a way for all eight to be visible at the same time, assuming that the stack of all eight TO panels is arranged without any TO panels being removed from the stack or flipped over. Each tab portion 33*a*–40*a* has a different and contrasting color in order to make identification and selection of the desired TO panel easier. Each of the eight TO panels have a similar format, although a different content and one TO panel is illustrated in FIG. 5. Further, the selected colors for like components on the TO panels and on the FROM panels are the same.

Figure 4:
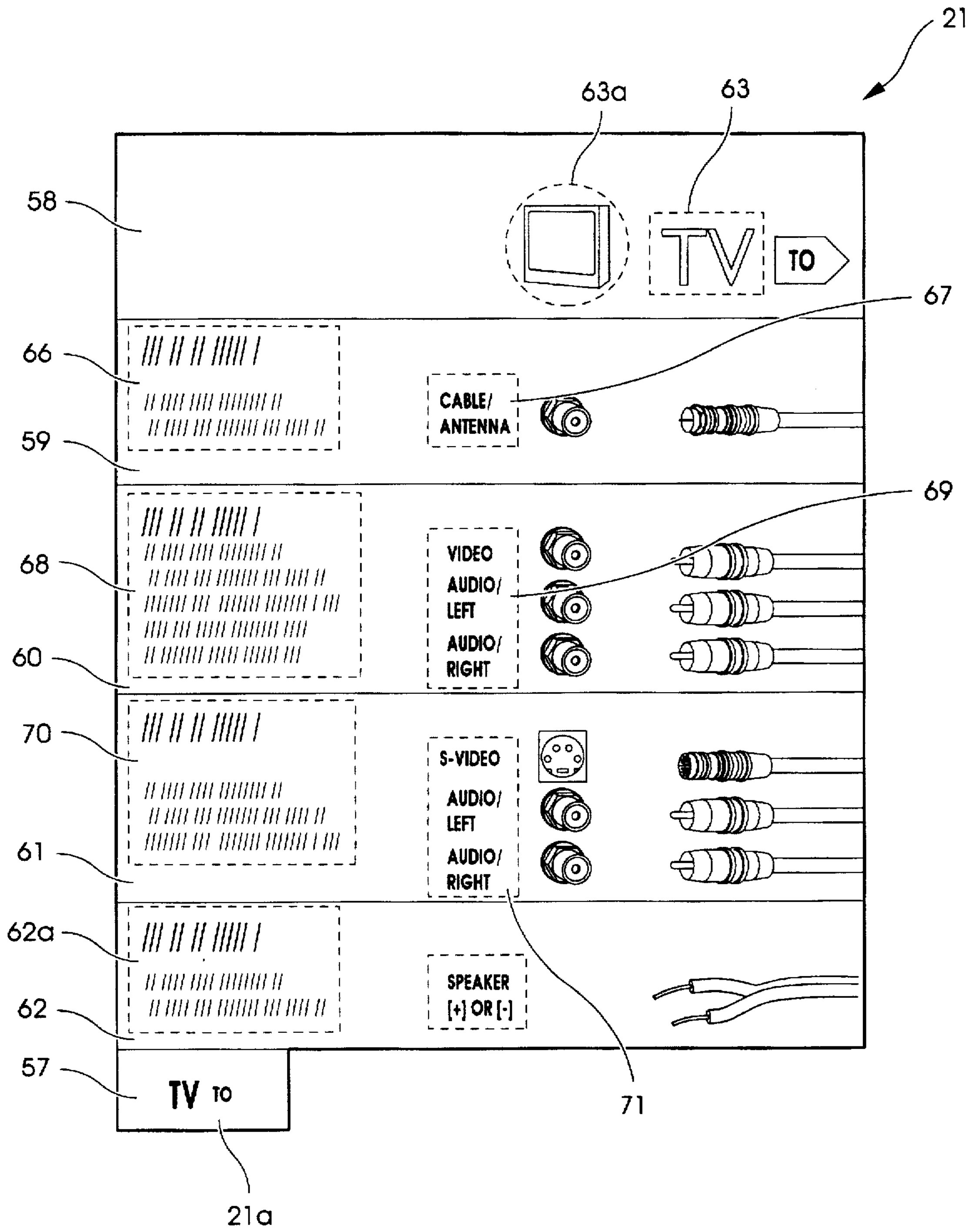
FIG. 4 is a top plan view of one of the FIG. 2 first panels according to the present invention.

Referring to FIG. 4, a selected FROM panel 21 is illustrated and the component which is detailed on this panel is a television. FROM panel 21 is representative of all FROM panels as to the format and type of data included. The remaining FROM panels are arranged for the following corresponding consumer electronic equipment:

FROM panel 22—VCR
FROM panel 23—Cable Box
FROM panel 24—Receiver
FROM panel 25—Laser Disc
FROM panel 26—CD Player or Cassette Deck
FROM panel 27—Digital Satellite System
FROM panel 28—Speakers FROM panel 21 includes six possible data regions 57–62, one of which, region 57, includes tab portion 21*a*. Region 58 includes a description of the item of equipment in area 63 and an illustration of the item of equipment in area 63*a*. Region 59 which corresponds to the first hook up option includes a general description in area 66 of the type or quality of connection which will be achieved if that hook up option is selected. This area also describes the type or style of cable connector which is used. Area 67 includes labeling for the connection jack which is illustrated. The final item of information in region 59 is an illustration of one end of the required cable for the desired equipment connections.

Region 60 which corresponds to the second hook up option includes a general description in area 68 of the type or quality of connection which will be achieved if that hook up option is selected. This area also describes the type or style of cable connector which is used. Area 69 includes labeling for the connection jacks which are illustrated. The final item of information in region 60 is an illustration of one end of each of the required cables for the desired equipment connections.

Region 61 which corresponds to the third hook up option includes a general description in area 70 of the type or quality of connection which will be achieved if that hook up option is selected. This area also describes the type or style of cable connector which is used. Area 71 includes labeling for the connection jacks which are illustrated. The final item of information in region 61 is an illustration of one end of the required cables for the desired equipment connections.

Region 62 includes any other information which may be relevant to the particular component detailed in region 58. In the case of panel 21 region 62 contains speaker wire information in area 62*a*.

Referring to FIG. 5 a selected TO panel 33 is illustrated and the component which is detailed on this panel is a VCR. TO panel 33 is representative of all TO panels as to the format and type of data included. The remaining TO panels are arranged for the following corresponding consumer electronic equipment:

TO panel 34—Cable Box

TO panel 35—Receiver

TO panel 36—Laser Disc

TO panel 37—CD Player or Cassette Deck

TO panel 38—Television

TO panel 39—Speakers

TO panel 40—Digital Satellite System

TO panel 33 includes six possible data regions 75–80, one of which, region 75, includes tab portion 33*a*. Region 76 includes a description of the item of equipment in area 81*a* and an illustration of the item of equipment in area 81*a*.

Region 77 which corresponds to the first hook up option includes an illustration of one end of the required cable for the desired FROM-TO equipment connection. The length of cable illustrated in region 77 is positioned so as to horizontally align with the length of cable illustrated in region 59 (see FIG. 4). The corresponding connection jack is illustrated and in area 84 labeling for the illustrated jack is provided. In area 85 there is a general description of how the equipment components may be arranged relative to each other and the corresponding or recommended cable length for each arrangement. This data is then translated into a cable model number or part number which is listed in area 86. Area 87 identifies the particular hook up option which corresponds to region 77.

Region 78 which corresponds to a second hook up option includes an illustration of one end of the required cables for the desired FROM-TO equipment connection. The lengths of cable illustrated in region 78 are positioned so as to horizontally align with the lengths of cable illustrated in region 60 (see FIG. 4). The corresponding connection jacks are illustrated and in area 89 labeling for the illustrated connection jacks is provided. In area 90 there is a general description of how the equipment components may be arranged relative to each other and the corresponding or recommended cable lengths. This data is then translated into cable model numbers or part numbers which are listed in area 91. Area 92 identifies the hook up option which corresponds to region 78.

Region 79 corresponds to the third hook up option which includes an illustration of one end of the required cables for the desired FROM-TO equipment connection. The lengths of cable illustrated in region 79 are positioned so as to horizontally align with the lengths of cable illustrated in region 61 (see FIG. 4). The corresponding connection jacks are illustrated and in area 94 labeling for the illustrated connection jacks is provided. In area 95 there is a general description of how the equipment components may be arranged relative to each other and the corresponding or recommended cable lengths. This data is then translated into cable model numbers or part numbers which are listed in area 96. Area 97 identifies the hook up option which corresponds to region 79.

Region 80 includes any other information which may be relevant to the particular component detailed in region 76. In the case of panel 33 region 80 does not contain any information.

Having thus described the details of the present invention relative to FIGS. 1–5, it should be clear how the flip book 20 can be used. Any items of consumer electronic equipment can be connected one to one or connected in a larger network by simply flipping through stack 51 and correspondingly through stack 54 in order to select the desired items of equipment which are to be connected. Once the two items of equipment are displayed side-by-side with their corresponding FROM panel and TO panel, all the required information is visible to the user and, if available, different hook up options are provided. The details of each hook up option are illustrated and described and for each option cable recommendations are given. The user can also see what the connector or jack on the equipment looks like and what the required cable will look like. The provided data also explores different positioning options for the equipment and determines the necessary cable length for each. The user becomes not only better informed regarding the equipment but is able to leave the store with all of the necessary cables in hand for completing the desired interconnection of electronic equipment. The flip book may also spark an interest in some hook up option which the customer may not have thought about. A possible consequence is that another component is purchased.

While the design of flip book 20 has been styled, in the preferred embodiment, for the connection of consumer electronic equipment, flip book 20 is not limited to that single use. The side-by-side or adjacent stacks of data/information panels secured together in a common binder or holder could be used for other items or topics which are related and may contain different information.

For example, a similarly configured flip book could be used for automobile accessories, both mechanical and electrical. Other representative embodiments include food applications such as spices matched with foods/recipes that uses spices, office supplies such as typewriter ribbons or printer cartridges and their matching components, medicines or pharmaceuticals such as cold medicines wherein symptoms match with products for relief, toy applications wherein various toys match with age groups that use such toys, and the like.

It is also contemplated that the number of stacks of data/information panels can be increased to some larger number or decreased to some smaller number. As long as these panels are configured to allow the individual panels to be flipped back and forth and so long as the stacks are arranged in an adjacent configuration, the flip book can be used as an informational aid for any number of items.

The flip book can also employ any number of different types of binders, holders, arranging means and the like to maintain the adjacent positioning of the stacks. Further, the adjacent positioning may be maintained at the top, bottom or sides of the stacks. These various modifications and others can be incorporated without detracting from the teachings of the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

For example, although the invention has been described and illustrated in a so-called "hardback" or "softback" form, it is contemplated that the invention may be presented in other media forms such as "electronic" or the like. The flip book can be incorporated into CD-ROM software or other computer compatible media so long as the panels are "electronically" configured to allow the individual panels to be "flipped" back and forth and so long as the stacks are "electronically" arranged in an adjacent configuration.

What is claimed is:

1. A connection instructional device comprising:

a plurality of FROM panels each of which is arranged with electrical connection indicia corresponding to electronic apparata, each FROM panel of said plurality of FROM panels corresponding to a different electronic apparatus;

a plurality of TO panels each of which is arranged with electrical connection indicia corresponding to electronic apparata, each TO panel of said plurality of TO panels corresponding to a different electronic apparatus;

a holder constructed and arranged for receiving said plurality of FROM panels in a first stacked array and said plurality of TO panels in a second stacked array, said first and second stacked arrays being positioned side-by-side to each other; and flipchart means for permitting a preselected one of said FROM panels to be positioned for viewing and a preselected one of said TO panels to be positioned for simultaneous viewing, side-by-side with said preselected FROM panel, whereby the electrical connection indicia on said preselected FROM panel and on said preselected TO panel indicate the connections to be made and the components required to electrically connect the electronic apparatus corresponding to said preselected FROM panel with the electronic apparatus corresponding to said preselected TO panel.

2. The connection instructional device of claim 1 wherein there are a total of nine FROM panels and a total of eleven TO panels.

3. The connection instructional device of claim 1 wherein said electronic apparata is consumer electronic apparata.

* * * * *